(12) United States Patent
Still et al.

(10) Patent No.: US 12,074,892 B2
(45) Date of Patent: Aug. 27, 2024

(54) METHOD OF PROCESSING WEB REQUESTS DIRECTED TO A WEBSITE

(71) Applicant: NETACEA LIMITED, Manchester (GB)

(72) Inventors: Andrew Still, Manchester (GB); Mark Greenwood, Manchester (GB); Doug Greenall, Manchester (GB); Daniel Lyon, Manchester (GB); Jennifer Talbot, Manchester (GB)

(73) Assignee: NETACEA LIMITED, Manchester (GB)

( * ) Notice: Subject to any disclaimer, the term of this patent is extended or adjusted under 35 U.S.C. 154(b) by 567 days.

(21) Appl. No.: 16/651,530

(22) PCT Filed: Sep. 19, 2018

(86) PCT No.: PCT/EP2018/075390
§ 371 (c)(1),
(2) Date: Mar. 27, 2020

(87) PCT Pub. No.: WO2019/063389
PCT Pub. Date: Apr. 4, 2019

(65) Prior Publication Data
US 2020/0267172 A1 Aug. 20, 2020

(30) Foreign Application Priority Data
Sep. 29, 2017 (GB) ..................... 1715801

(51) Int. Cl.
*H04L 9/40* (2022.01)
*G06N 20/00* (2019.01)
(52) U.S. Cl.
CPC ......... *H04L 63/1425* (2013.01); *G06N 20/00* (2019.01); *H04L 63/1466* (2013.01); *H04L 63/1483* (2013.01); *H04L 2463/144* (2013.01)

(58) Field of Classification Search
CPC ............ H04L 63/1425; H04L 63/1466; H04L 63/1483; H04L 63/1408; H04L 63/1441; H04L 2463/144; G06N 20/00
See application file for complete search history.

(56) References Cited

U.S. PATENT DOCUMENTS 8,490,190 B1 * 7/2013 Hernacki ............ H04L 63/1425
726/28
10,326,789 B1 * 6/2019 Vines .................. H04L 63/1466
(Continued)

FOREIGN PATENT DOCUMENTS

WO 2010143152 A2 12/2010

OTHER PUBLICATIONS

N. Algiriyage, S. Jayasena, G. Dias, A. Perera and K. Dayananda, "Identification and characterization of crawlers through analysis of web logs," 2013 IEEE 8th International Conference on Industrial and Information Systems, 2013, pp. 150-155, doi: 10.1109/ICIInfS.2013.6731972. (Year: 2013).*
(Continued)

*Primary Examiner* — Robert B Leung
(74) *Attorney, Agent, or Firm* — NK Patent Law

(57) ABSTRACT

A method of processing web requests directed to a website, the method including: (i) receiving a plurality of web requests directed to the website; (ii) for each of the plurality of web requests, identifying a source from which the web request has originated; (iii) for at least one web request identified as having originated from a given source: determining whether the source is a bot or a non-bot based on the at least one web request; if the source is determined to be a bot, using a machine learning engine to assign one of a plurality of predetermined bot categories to the source based on the at least one web request.

17 Claims, 1 Drawing Sheet

(56) References Cited

U.S. PATENT DOCUMENTS

| | | | |
|---|---|---|---|
| 2008/0080518 A1* | 4/2008 | Hoeflin | H04L 63/1425 370/395.42 |
| 2010/0281539 A1* | 11/2010 | Burns | H04L 63/1441 726/13 |
| 2011/0131652 A1 | 6/2011 | Robinson et al. | |
| 2011/0208714 A1* | 8/2011 | Soukal | H04L 63/1425 707/E17.108 |
| 2012/0210420 A1* | 8/2012 | Rybalko | H04L 51/12 726/22 |
| 2015/0350181 A1* | 12/2015 | Call | H04L 63/1466 726/6 |
| 2015/0350213 A1* | 12/2015 | Varadarajan | H04L 63/06 713/189 |
| 2016/0006744 A1 | 1/2016 | Du et al. | |
| 2016/0191554 A1* | 6/2016 | Kaminsky | H04L 63/1425 726/23 |
| 2017/0185758 A1* | 6/2017 | Oliker | G06F 21/316 |
| 2017/0244737 A1* | 8/2017 | Kuperman | H04L 63/1425 |

OTHER PUBLICATIONS

D. Doran, Detection, Classification, and Workload Analysis of Web Robots, University of Connecticut, Doctoral Dissertations, Apr. 18, 2014. 215 pages. (Year: 2014).*

FortiWeb documentation [https://help.fortinet.com/fweb/537/Content/FortiWeb/fortiweb-admin/blacklisting.htm] (Blacklisting & whitelisting clients (archive.org) web captured on Aug. 20, 2016) (Year: 2016).*

FortiWeb documentation [http://help.fortinet.com/fweb/537/Content/FortiWeb/fortiweb-admin/configure_profile_inline.htm] (Configuring a protection profile for inline topologies (archive.org) web captured Aug. 20, 2016 (Year: 2016).*

Doran, D., Gokhale, S.S. Web robot detection techniques: overview and limitations. Data Min Knowl Disc 22, 183-210 (2011). (Year: 2011).*

ISA/EPO, International Search Report and Written Opinion for PCT Patent Application No. PCT/EP2018/075390, dated Nov. 7, 2018, 9 pages.

* cited by examiner

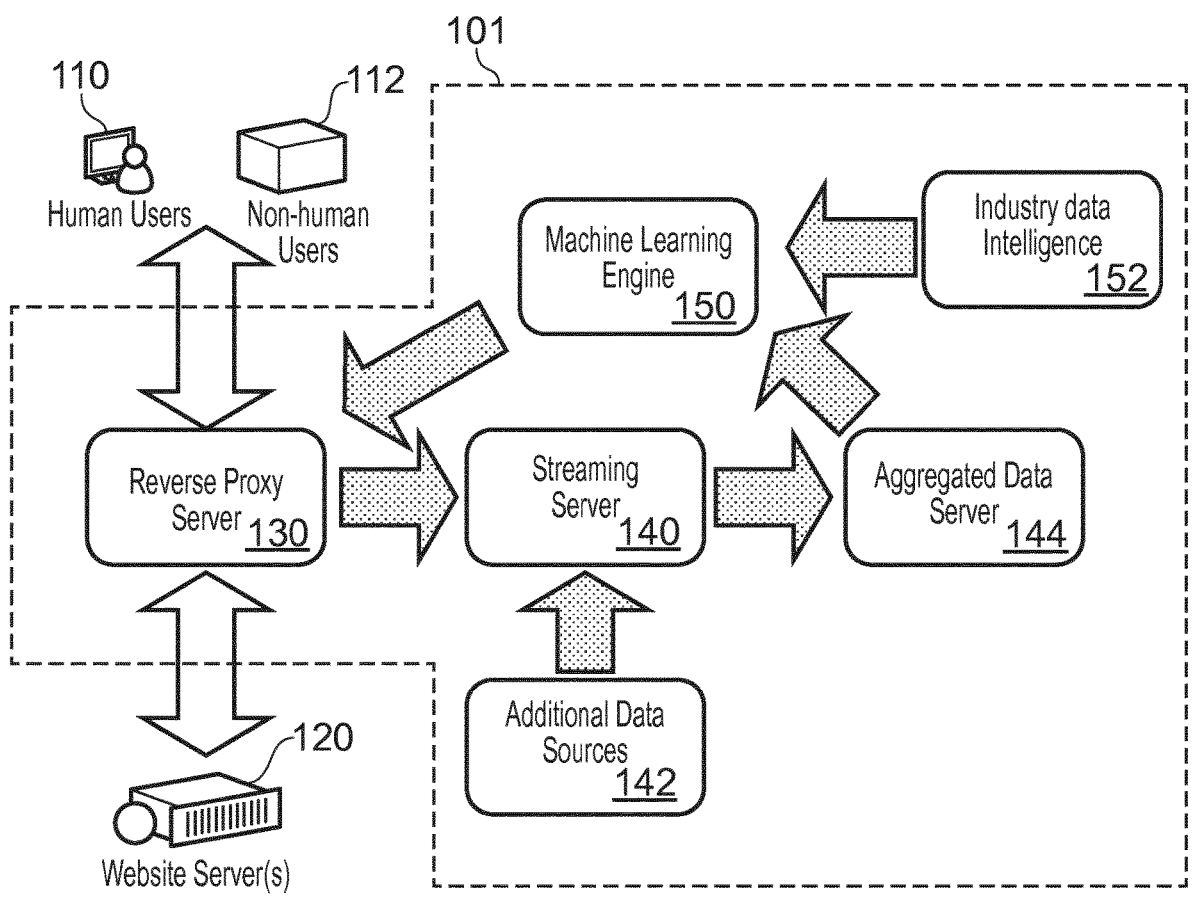

METHOD OF PROCESSING WEB REQUESTS DIRECTED TO A WEBSITE

CROSS REFERENCE TO RELATED APPLICATIONS

This application is a U.S. National Stage application of PCT Patent Application No. PCT/EP2018/075390 filed on Sep. 19, 2018, which claims priority to United Kingdom Patent Application No. 1715801.5 filed on Sep. 29, 2017, the entire content of all of which is incorporated by reference herein.

FIELD OF THE INVENTION

The present invention relates to a method of processing web requests directed to a website.

BACKGROUND

Websites (and therefore the web servers that host them) typically receive a large amount of web requests for content/data. These web requests can be initiated as a direct consequence of human action, typically through user interaction with a web browser. However increasingly web requests are being initiated automatically, i.e. not as a direct consequence of human action. A source of automated web requests is commonly referred to as a "bot" (as noted in more detail below, a bot would typically be set up by a human, but the individual web requests made by a bot are in general not initiated as a direct consequence of human action). There is no fundamental difference between a web request originating from a bot and a web request originating from a human user. So, when a web request from a bot reaches a web server that hosts a website, the web server might not be able to distinguish the web request from a human user (there are ways for a bot to identify itself as such in the web requests it sends, but this is voluntary and can easily be disguised).

Bots exist to fulfil a variety of purposes that are both positive, negative and neutral to the website they sending requests to, the positivity/negativity of the traffic will vary depending on the industry and/or business model of the system in question.

There are systems in existence that are aimed at identifying bot traffic. Such existing systems typically look at information in (e.g. a header of) an individual request to determine whether that request originated from a bot, or they will look at simple metrics (e.g. frequency of request) to ascertain whether the request originated from a bot. However, the present inventors have observed that existing systems at best can identify non-human vs human (bot vs non-bot) traffic, and do not give a level of detail about the nature of the traffic to allow a more informed decision to be taken on how to handle that traffic.

The present invention has been devised in light of the above considerations.

SUMMARY OF THE INVENTION

A first aspect of the invention provides a method of processing web requests directed to a website, the method including:
 (i) receiving a plurality of web requests directed to the website;
 (ii) for each of the plurality of web requests, identifying a source from which the web request has originated;
 (iii) for at least one web request identified as having originated from a given source:
  determining whether the source is a bot or a non-bot based on the at least one web request;
  if the source is determined to be a bot, using a machine learning engine to assign one of a plurality of predetermined bot categories to the source based on the at least one web request.

An insight behind the present invention is that the inventors found that assigning a bot category to a source based on fixed criteria can be very difficult, whereas it has been found that a machine learning engine can assign bot categories more accurately, without needing to depend on fixed criteria.

For brevity, a web request identified as having originated from a given source may sometimes be referred to as a web request sent by the source, herein.

For the purposes of this disclosure, a website may be defined as a collection of one or more related webpages, typically identified by a common domain name, and typically hosted by at least one web server. A web request directed to a website may, for example, request data (e.g. a webpage) from the website. A web request may be sent via a network protocol used for distribution of information on the world wide web, e.g. the Hypertext Transfer Protocol ("HTTP"). A web request sent via HTTP is typically referred to as an HTTP request. An encrypted web request sent via HTTP is typically referred to as an HTTPS request (with "S" standing for secure).

For the purposes of this disclosure, a source may be defined as a computer system or set of computer systems that can be uniquely identified (i.e. identified so as to be distinguished from other computer systems) as the origin of a web request, based on information contained in the web request. Techniques for identifying the source of a web request based on information contained in the web request are well known and may involve, for example, using information contained in a header of the web request (e.g. which may include an IP address associated with the source, user headers and/or cookie information uniquely identifying the source). As described in more detail below, fingerprinting data injected into responses issued by a website (and subsequently received by a source) may be used to influence future web requests sent by a source so that future web requests from the source can be identified as originating from that source.

For the purpose of this disclosure, a "non-bot" can be understood as a source that is determined to be making one or more web requests which are initiated as a direct consequence of human action, typically through user interaction with a web browser, e.g. through a user pressing a mouse button, hitting an "enter" key or a "refresh" button. For the purposes of this disclosure, the "user" is intended to refer to a human user.

For the purposes of this disclosure, a "bot" can be understood as a source that is determined to be making one or more web requests automatically, i.e. making web requests which are not initiated as a direct consequence of human action. Of course, a bot would typically be set up or configured by a human, but the individual web requests made by a bot would not be initiated as a direct consequence of human action.

For the purposes of this disclosure, a web server may be defined as a computer system configured to host one or more websites, and to process web requests for data sent by a network protocol used for distribution of information on the world wide web.

The machine learning engine may use at least one model and/or algorithm that has been trained by the machine learning engine using historical web request data to assign one of the plurality of predetermined bot categories to the source.

Machine learning engines which make a determination based on an input, using at least one model and/or algorithm that has been trained by the machine learning engine itself using historical data, are well known and techniques for building such machine learning engines do not need to be described further herein. Example techniques for building machine learning engines are discussed, for example, in "Pattern recognition and machine learning" (a book by Christopher M. Bishop, 2006).

The historical web request data (used by the machine learning engine to train the at least one model and/or algorithm used to assign a bot category to the source) preferably includes previous web requests directed to the website, i.e. the same website to which the plurality of web requests are directed. In this way, historical web requests directed to the website can be used (by the machine learning engine) to categorise the source of subsequent web requests directed to the same website.

The historical web request data (used by the machine learning engine to train the at least one model and/or algorithm used to assign a bot category to the source) may additionally/alternatively include web requests directed to other websites.

The machine learning engine may assign one or the predetermined bot categories to the source along with a confidence level associated with the assigned bot category, wherein the confidence level associated with the assigned bot category represents a level of confidence that the assigned bot category is correct.

The machine learning engine may use at least one model and/or algorithm that has been trained by the machine learning engine using historical web request data to determine the confidence level associated with the assigned bot category.

For avoidance of any doubt, the machine learning engine may assign more than one of the predetermined bot categories to the source along with a confidence level associated with each assigned bot category, wherein the confidence level associated with each assigned bot category represents a level of confidence that the assigned bot category is correct.

Where more than one bot category is assigned to a source, and where treatment of one or more requests from that source requires a single bot category to be assigned to the source, the bot category to which the source has been assigned with the highest confidence score may be used as a single bot category to which that source has been assigned.

Machine learning engines which make a determination based on an input, and which associate a confidence level with the determination, are well known and do not need to be described further herein. Example techniques for building machine learning engines which associate a confidence level with determinations made by the machine learning engines are discussed, for example, in "Pattern recognition and machine learning" (a book by Christopher M. Bishop, 2006).

A machine learning engine may be used to determine whether the source is a bot or a non-bot based on the at least one web request. That is, the method may include using a machine learning engine to determine whether the source is a bot or a non-bot based on the at least one web request.

The machine learning engine (used to determine whether the source is a bot or a non-bot) may use at least one model and/or algorithm that has been trained by the machine learning engine using historical web request data to determine whether the source is a bot or a non-bot based on the at least one web request.

For avoidance of any doubt, the machine learning engine used to determine whether the source is a bot or a non-bot may be the same machine learning engine as the machine learning engine used to assign a bot category to the source, or could be a separate machine learning engine. Also for the avoidance of any doubt, any machine learning engine as described herein may be implemented by software.

The historical web request data (used by the machine learning engine to train the at least one model and/or algorithm used to determine whether the source is a bot or a non-bot) preferably includes previous web requests directed to the website, i.e. the same website to which the plurality of web requests are directed. In this way, historical web requests directed to the website can be used (by the machine learning engine) to determine whether the source is a bot or a non-bot.

The historical web request data (used by the machine learning engine to train the at least one model and/or algorithm used to determine whether the source is a bot or a non-bot) may additionally/alternatively include web requests directed to other websites.

The machine learning engine (used to determine whether the source is a bot or a non-bot) may be configured to determine whether the source is a bot or a non-bot along with a confidence level associated with the determination (of bot or non-bot), wherein the confidence level associated with the determination represents a level of confidence that the determination (of bot or non-bot) is correct.

The machine learning engine (used to determine whether the source is a bot or a non-bot) may use at least one model and/or algorithm that has been trained by the machine learning engine using historical web request data to determine the confidence level associated with the determination (of bot or non-bot).

For the avoidance of any doubt, the machine learning engine (used to assign one of a plurality of predetermined bot categories to the source) may assign one of a plurality of predetermined bot categories to the source based indirectly on the at least one request, e.g. using information describing the at least one request (rather than using the at least one request itself). Similarly, the machine learning engine used to determine whether the source is a bot or a non-bot may determine whether the source is a bot or a non-bot based indirectly on the at least one request, e.g. using information describing the at least one request (rather than using the at least one request itself).

Information describing the at least one web request may be extracted from the at least one web request, e.g. by a proxy server (see below), before being passed to the machine learning engine.

Information describing the at least one web request (e.g. as extracted by the proxy server) may be augmented (e.g. by a streaming server) with supplementary information describing the source and/or the at least one web request before being passed to a machine learning engine. The supplementary information describing the source and/or the at least one web request may be obtained by comparing the at least one web request or information describing the at least one web request with one or more additional data sources that contains previously established information regarding sources of web requests.

The determination (of whether the source is a bot or a non-bot) and the assignment (of one of a plurality of predetermined bot categories to the source) is preferably based on a plurality of web requests, rather than a single web request, though the determination and/or assignment could be made based on a single web request.

If a plurality of web requests are identified as having originated from a given source, e.g. within a session associated with that source, information describing the plurality of web requests may be aggregated (e.g. by an aggregated data server), e.g. before being passed to the machine learning engine.

The information describing the plurality of web requests may be aggregated on a session-by-session basis, e.g. with information describing web requests identified as having originated from a given source within a session associated with that source being aggregated. A session associated with a source may be a period of time determined using predetermined criteria, e.g. such as elapsed time between web requests identified as having originated from that source. For example, a new session associated with a source may be started if a web request identified as having originated from the source is received when there is no currently running session associated with the source. A running session associated with the source may be ended if no web request is received from the source for a predetermined period of time.

For avoidance of any doubt, each session associated with a given source need not have a same length, and sessions associated with different sources need not start or end at the same times.

Preferably, step (iii) is performed for a plurality of requests identified as having originated from a given source (in other words, the at least one web request identified as having originated from a given source may include a plurality of such web requests). This is preferred because, whilst a source could be accurately assigned to one of the predetermined bot categories based on a single web request sent by the source (e.g. based on IP addresses of bots of a known category, or by supplied HTTP Header information identifying the "User Agent" that is making the request as a bot of a known category), it may be possible to make a more accurate assignment based on several web requests from the same source.

Preferably, step (iii) is performed for the/each source identified as originating one or more of the plurality of web requests.

The plurality of predetermined bot categories may distinguish between bots intended to carry out different actions, e.g. on behalf of a bot administrator.

For example, the predetermined bot categories may include two or more of: price scraping, ad fraud, content theft, search engine spider, account takeover, fake account creation.

This is not an exhaustive list, and bots designed to carry out new actions are being created by bot administrators on an ongoing basis. Some example actions that bots are created to carry out are discussed in the OWASP Automated Threat Handbook, version 1.1, published 3 Nov. 2016 by the OWASP foundation (https://www.owasp.org/images/3/33/Automated-threat-handbook.pdf).

Preferably, a proxy server is configured to manage web requests directed to the website and responses to web requests issued by the website. Such a proxy server is commonly referred to as a "reverse proxy server", since instead of acting as a proxy for web requests sent to the internet on behalf of a user issuing web requests, it instead acts as a proxy for web requests received from the internet on behalf of a website to which the web requests are directed.

The proxy server may be configured to receive web requests (preferably all web requests) directed to the website. This may be achieved by updating DNS records so that web requests directed to the website are directed to the website via the proxy server.

As noted above, the website may be hosted by at least one web server. The proxy server is preferably distinct from the/each web server that hosts the website.

The proxy server may be configured to pass web requests directed to the website (but not necessarily all of the web requests it receives, see below) on to a web server hosting the website.

The website may be configured to issue responses to web requests it receives (but not necessarily all of the web requests it receives, see below). A response to a web request issued by the website may contain website content. A response to a web request issued by the website may be directed towards a source identified as having originated the web request.

Responses issued by the website may be routed through the proxy server, e.g. with the proxy server being configured to direct each response issued by the website to the source to which the response is directed.

The method may include injecting fingerprinting data into responses issued by the website, wherein the fingerprinting data injected into each response is configured to influence future web requests sent by a source that receives the response, preferably so that future web requests from the source that receives the response can be identified as originating from that source and/or so that future behaviour of the source can otherwise be monitored (e.g. to ascertain whether a request has been executed by a web browser). This may, for example, allow web requests from the same IP address to be identified as originating from different sources and/or to allow web requests from different IP addresses to be identified as originating from the same source. This may also help in categorising the source.

Fingerprinting data injected into a response may include, for example, session ID information, cookie values or a javascript function. Techniques for injecting and using such fingerprinting data are well known and do not need to be described in further detail herein. The fingerprinting data may be injected, for example, by the proxy server, the website or a web server that hosts the website (preferably the proxy server).

The method may include handling one or more subsequent web requests sent by the source differently, depending on whether the source is determined to be a bot or a non-bot, and optionally depending on a confidence level associated with the determination (of bot or non-bot).

For example, if the proxy server is present (see above), the method may include:
 (a) if the source is determined to be a non-bot, the proxy server passing the/each subsequent web request sent by the source on to a web server hosting the website; and
 (b) if the source is determined to be a bot, the proxy server not passing one or more (e.g. a subset of or all) subsequent web requests sent by the source on to a web server hosting the website.

The proxy server could e.g. be configured to not pass one or more subsequent web requests sent by the source by use e.g. of a blacklist and/or greylist, which list(s) could be populated by the machine learning engine, for example. The population of the blacklist and/or greylist could be updated each session, for example.

Additionally or alternatively, the method may include:
(c) if the source is determined to be a non-bot, the website issuing a response that contains website content configured for a non-bot to the/each subsequent web request sent by the source; and
(d) if the source is determined to be a bot, the website not issuing a response to one or more subsequent web requests sent by the source and/or the website issuing responses that contain website content configured for a bot to one or more subsequent web requests sent by the source.

Website content configured for a bot may, for example, take the form of a cut down (e.g. smaller size) version of the webpage configured for a non-bot, a webpage containing fake content, or a CAPTCHA ("Completely Automated Public Turing test to tell Computers and Humans Apart").

One or more of steps (a)-(d) may be dependent on a confidence level associated with the determination (of bot or non-bot).

For example, either/both of steps (b) and (d) could be dependent on a confidence level associated with the determination (of the source being a bot) exceeding a predetermined threshold.

For example, step (b) could be modified to be as follows:
(b) if the source is determined to be a bot and a confidence level associated with the determination that the source is a bot exceeds a predetermined threshold, the proxy server not passing one or more (e.g. a subset of or all) subsequent web requests sent by the source on to a web server hosting the website.

In connection with this example, if the confidence level associated with the determination that the source is a bot does not exceed the predetermined threshold, then the proxy server may treat the source in the same way as a non-bot (e.g. in accordance with step (a)).

For example, step (d) could be modified to be as follows:
(d) if the source is determined to be a bot and a confidence level associated with the determination that the source is a bot exceeds a predetermined threshold, the website not issuing a response to one or more subsequent web requests sent by the source and/or the website issuing responses that contain website content configured for a bot to one or more subsequent web requests sent by the source.

In connection with this example, if the confidence level associated with the determination that the source is a bot does not exceed the predetermined threshold, then the website may treat the source in the same way as a non-bot (e.g. in accordance with step (c)).

One or more of steps (a)-(d) may be dependent on a rate of web requests directed to the website (rate=web requests received per unit of time).

For example, either/both of steps (b) and (d) could be dependent on a rate of web requests directed to the website exceeding a predetermined threshold.

For example, step (b) could be modified to be as follows:
(b) if the source is determined to be a bot and a rate of web requests directed to the website exceeds a predetermined threshold, the proxy server not passing one or more (e.g. a subset of or all) subsequent web requests sent by the source on to a web server hosting the website.

In connection with this example, if a rate of web requests directed to the website did not exceed the predetermined threshold, then the proxy server may treat the source in the same way as a non-bot (e.g. in an analogous fashion to step (a)).

For example, step (d) could be modified to be as follows:
(d) if the source is determined to be a bot and a rate of web requests directed to the website exceeds a predetermined threshold, the website not issuing a response to one or more subsequent web requests sent by the source and/or the website issuing responses that contain website content configured for a bot to one or more subsequent web requests sent by the source.

In connection with this example, if a rate of web requests directed to the website did not exceed the predetermined threshold, then the website may treat the source in the same way as a non-bot (e.g. in accordance with step (c)).

The method may include, if the source has been determined to be a bot, handling one or more subsequent web requests sent by the source differently, depending on which of the predetermined bot categories has been assigned to the source, and optionally depending on a confidence level associated with the assigned bot category.

For example, if the proxy server is present (see above), the method may include:
(I) if a first bot category is assigned to the source, the proxy server passing the/each subsequent web request sent by the source on to a web server hosting the website; and
(II) if a second bot category is assigned to the source, the proxy server not passing one or more (e.g. a subset of or all) subsequent web requests sent by the source on to a web server hosting the website.

Additionally or alternatively, the method may include:
(III) if a first bot category is assigned to the source, the website issuing a response that contains website content configured for the first bot category to the/each subsequent web request sent by the source; and
(IV) if a second bot category is assigned to the source, the website not issuing a response to one or more (e.g. a subset of or all) subsequent web requests sent by the source and/or the website issuing responses that contain website content configured for the second bot category to one or more subsequent web requests sent by the source.

In this way, different categories of bot can be handled differently.

For example, the proxy server may not pass a subset of (or all) subsequent web requests sent by the source on to the web server if, for example, the first bot category is deemed (e.g. by an administrator) to be more benign (for the purposes of the website) than the second bot category.

For example, the website content configured for the second bot category may be a cut down version of the website content configured for the first bot category, e.g. if it is deemed (e.g. by an administrator) that the second bot category does not require the full website content but the first bot category does.

The first and second bot categories in steps (III) and (IV) may in some examples be the same as the first and second bot categories in steps (I) and (II).

Website content configured for a first and/or second bot category may, for example, take the form of a cut down (e.g. smaller size) version of the webpage configured for a non-bot, a webpage containing fake content, or a CAPTCHA ("Completely Automated Public Turing test to tell Computers and Humans Apart").

Any one or more of steps (I)-(IV) may be dependent on a confidence level associated with the assigned bot category.

For example, steps (I) and (II) could be modified to be as follows:
- (I) if a first bot category is assigned to the source and the confidence level associated with the assigned first bot category exceeds a predetermined threshold, the proxy server passing the/each subsequent web request sent by the source on to a web server hosting the website; and
- (II) if a second bot category is assigned to the source and the confidence level associated with the assigned first bot category exceeds a predetermined threshold, the proxy server not passing one or more (e.g. a subset of or all) subsequent web requests sent by the source on to a web server hosting the website.

In connection with this example, if a confidence level associated with the assigned first and/or second bot category does not exceed the predetermined threshold, then the proxy server may treat the source in the same way as a non-bot (e.g. in accordance with step (a)).

For example, steps (III) and (IV) could be modified to be as follows:
- (III) if a first bot category is assigned to the source and the confidence level associated with the assigned first bot category exceeds a predetermined threshold, the website issuing a response that contains website content configured for the first bot category to the/each subsequent web request sent by the source; and
- (IV) if a second bot category is assigned to the source and the confidence level associated with the assigned first bot category exceeds a predetermined threshold, the website not issuing a response to one or more (e.g. a subset of or all) subsequent web requests sent by the source and/or the website issuing responses that contain website content configured for the second bot category to one or more subsequent web requests sent by the source.

In connection with this example, if a confidence level associated with the assigned first and/or second bot category does not exceed the predetermined threshold but exceeds some lower predetermined threshold, then the website may issue a response that includes a webpage containing a CAPTCHA to verify whether the source is a bot or a non-bot.

In connection with this example, if a confidence level associated with the assigned first and/or second bot category does not exceed the predetermined threshold, then the website may simply treat the source in the same way as a non-bot (e.g. in accordance with step (c)).

Any one or more of steps (I)-(IV) may be dependent on a rate of web requests directed to the website (rate=web requests received per unit of time).

For example, steps (I) and (II) could be modified to be as follows:
- (I) if a first bot category is assigned to the source and a rate of web requests directed to the website exceeds a predetermined threshold, the proxy server passing the/each subsequent web request sent by the source on to a web server hosting the website; and
- (II) if a second bot category is assigned to the source and a rate of web requests directed to the website exceeds a predetermined threshold, the proxy server not passing one or more (e.g. a subset of or all) subsequent web requests sent by the source on to a web server hosting the website.

Thus, in a high load situation, web requests from bots of the first category can get through to the website, but a subset of or all web requests from bots of the second category cannot get through to the website. This may be useful e.g. if it is deemed (e.g. by an administrator) that the first bot category is more benign (for the purposes of the website) than the second bot category.

In connection with this example, if a rate of web requests directed to the website did not exceed the predetermined threshold, then the proxy server may treat the source in the same way as a non-bot (e.g. in accordance with step (a)).

For example, steps (III) and (IV) could be modified to be as follows:
- (III) if a first bot category is assigned to the source and a rate of web requests directed to the website exceeds a predetermined threshold, the website issuing a response that contains website content configured for the first bot category to the/each subsequent web request sent by the source; and
- (IV) if a second bot category is assigned to the source and a rate of web requests directed to the website exceeds a predetermined threshold, the website not issuing a response to one or more (e.g. a subset of or all) subsequent web requests sent by the source and/or the website issuing responses that contain website content configured for the second bot category to one or more subsequent web requests sent by the source.

In connection with this example, if a rate of web requests directed to the website did not exceed the predetermined threshold, then the website may treat the source in the same way as a non-bot (e.g. in accordance with step (c)).

A second aspect of the invention may provide a computer system for processing web requests directed to a website.

The computer system is preferably configured to carry out a method according to the first aspect of the invention.

The computer system may be configured to implement, or have means for implementing, any method step described in connection with the first aspect of the invention.

For example, the computer system may include the machine learning engine, e.g. wherein the machine learning engine is configured to perform any one or more method steps described above as being performed by the machine learning engine.

For example, the website may be configured to perform method steps described above as being performed by the website.

For example, the computer system may include a proxy server, which may be configured to perform method steps described above as being performed by the proxy server.

For example, the computer system may include one or more web servers hosting the website, e.g. wherein one or more web servers and/or the website are(/is) configured to perform any one or more method steps described above as being performed by one or more web servers and/or the website.

In some preferred examples, the computer system does not include any web servers that host the website (e.g. since the computer system may be located separately from and/or operated independently from the website).

A third aspect of the invention may provide a computer-readable medium having computer-executable instructions configured to cause a computer system to perform a method according to the first aspect of the invention.

The invention includes the combination of the aspects and preferred features described except where such a combination is clearly impermissible or expressly avoided.

SUMMARY OF THE FIGURES

FIG. 1 is a schematic diagram of a computer system for processing web requests directed to a website.

DETAILED DESCRIPTION OF THE INVENTION

Examples illustrating the principles of the invention will now be discussed with reference to the accompanying FIGURES.

FIG. 1 shows an example computer system 101 for processing web requests directed to a website. Also shown in FIG. 1 are one or more website servers 120 that host the website, as well as non-bots 110 (human users) and bots 112, which are responsible for initiating web requests directed to the website.

It may be noted that the computer system 101 may be located separately from and/or may be operated independently from the web server(s) 120 and website. In this way, the computer system 101 is able to take the burden of managing volumes of traffic to the website, which may help the web server(s) 120 and/or website from becoming overloaded, e.g. in the event of a high load situation. The operator of the website may be able to configure the computer system 101, e.g. via an interface (e.g. a web interface) provided by the computer system 101.

In general terms, the example computer system 101 seeks to carry out real time analysis on all traffic directed to the website to identify not just whether or not incoming web requests are sent by a source that is a bot 112 or a non-bot 110, but also seeks to identify the intent of web requests sent by bots 112, by assigning one of a plurality of predetermined bot categories (e.g. price scraper, ticket tout, account cracker, etc.) to each source that has been identified as a bot 112. As the categorisation of bots 112 is inherently an inexact assessment, the example computer system 101 also associates a level of confidence (in this example, in the form of a certainty score) with each assigned bot category. The example computer system 101 uses a machine learning approach to assess details of the web requests sent by the/each individual source (combined with industry and system wide data) to assign a bot category to a source determined to be a bot 112. This allows website administrators/owners to control not only how bot traffic is handled compared with non-bot traffic, but also allows administrators/owners to put in place a multi-layer policy for handling different categories of bot traffic, and the confidence level associated with an assigned bot categories allows administrators/owners to implement a risk based approach, balancing the risk of false positives with the negative impact of allowing requests from correctly identified bots to hit the system.

As shown in FIG. 1, the example computer system 101 includes a "reverse" proxy server 130 configured to manage web requests to the website and responses issued by the website.

The reverse proxy server 130 may be configured to receive all web requests directed to the website (from bot and non-bot sources). This may be achieved by updating DNS records so that web requests directed to the website are all directed to the website via the proxy server. The reverse proxy server 130 may be thought of as sitting in front of the website and intercepting all web requests directed to the website.

The reverse proxy server 130 may also be configured to identify a source from which the web request has originated, e.g. using known techniques which have already been discussed (above).

As explained in more detail below, the reverse proxy server 130 may be configured to analyse each request it receives and handle that request differently (e.g. by either passing/forwarding the request to a web server 120 hosting the website or not), depending on:

whether the source that sent the request has been determined to be a bot or a non-bot, and optionally depending on a confidence level associated with the determination (of bot or non-bot)

if the source has been determined to be a bot, depending on which of the predetermined bot categories has been assigned to the source, and optionally depending on a confidence level associated with the assigned bot category If a request is passed to a web server 120 hosting the website by the reverse proxy server 130, and the website issues a response, then the reverse proxy server 130 may direct the response back to the source identified as having originated the web request.

To assist in the reverse proxy server 130 identifying sources, the reverse proxy server 130 may inject fingerprinting data into responses issued by the website, in order to identify further requests from the same source. Techniques for injecting fingerprinting data have already been discussed, above.

As shown in FIG. 1, the example computer system 101 also includes a streaming server 140, one or more additional data sources 142, an aggregated data server 144, a machine learning engine 150 and industry data intelligence source 152.

The reverse proxy server 130 may be configured to extract information describing each web request, before passing that information to the streaming server 140. This information may include, for example, source IP address, any user headers, cookie values, time of the request, the URL being requested, and any other data that might usefully identify the source. Optionally, sensitive information (e.g. sensitive personal information relating to users, such as credit card details) may be excluded from the information passed by the reverse proxy server 130 to the streaming server 140.

The streaming server 140 preferably augments the information describing each web request, as received from the reverse proxy server 130, with supplementary information describing the source and/or the at least one web request, using information contained in the one or more additional data sources 142, to provide additional information regarding the source and/or request. Such additional information may include, for example, a country from which the request originated (or is believed to have originated), a data centre from which the request originated. These one or more additional data sources 142 may be held within the streaming server 140 and may contain a mixture of industry standard and proprietary information. The additional data is preferably configured to help categorise the source.

The streaming server 140 preferably passes the augmented information about each individual request to an aggregated data server 144, where the information relating to requests from the/each source is aggregated on a session-by-session basis, e.g. to create aggregated information describing all the requests originating from a given source within a session associated with that source A session associated with a source may be a period of time period of time determined using predetermined criteria, e.g. such as elapsed time between web requests identified as having originated from that source (e.g. as described above).

The aggregated information describing all requests received from a same source within each session may then be presented to the machine learning engine 150 for use in determining whether that source is a bot or a non-bot, as well as for assigning a predetermined bot category to the source (if the source is determined to be a bot).

The management of which web request belongs to which session, which may involve e.g. determination as to whether a given web request belongs to an existing or a new session, may be performed by the reverse proxy server 130.

The machine learning engine 150 uses the aggregated information describing all requests received from a source within a given session to firstly determine whether the source is a bot or non-bot along with a confidence level associated with the determination (of bot or non-bot), and, if the source is determined to be a bot, to assign one of the plurality of predetermined bot categories to the source along with a confidence level associated with the assigned bot category.

In carrying out these processes, the machine learning engine 150 may use machine learning techniques, which may involve e.g. using at least one model and/or algorithm that has been trained by the machine learning engine using historical web request data and/or using predetermined criteria (e.g. based on expected human usage of the website and/or known industry patterns of behaviour) to create the categorisation of this session. In this way, the machine learning engine can be seen as using intelligence gained from historical session information (which could include information from previous sessions associated with requests for the same website from the same source and/or from other sources) in determining whether a given source is a bot or a non-bot, as well as in assigning a predetermined bot category to the source (if the source is determined to be a bot).

Note that each source can be assigned to multiple bot categories. And for each bot category assigned to a given source, there is provided an associated confidence score representing a level of confidence that the assignation is correct. Where treatment of requests from a source require the source to be assigned to a single bot category, the bot category to which a source is assigned with the highest confidence score can be considered as the bot category to which that source has been assigned.

Having completed the categorisation, the machine learning engine relays that categorisation back to the reverse proxy server in order to allow future web requests to be handled differently (by the reverse proxy server 130 and/or the website), depending on:
  whether the source that sent the request has been determined to be a bot or a non-bot, and optionally depending on a confidence level associated with the determination (of bot or non-bot)
  if the source has been determined to be a bot, depending on which of the predetermined bot categories has been assigned to the source, and optionally depending on a confidence level associated with the assigned bot category Various ways in which the reverse proxy server 130 and/or the website could handle web requests from a source differently depending on these factors have already been discussed.

For example, the reverse proxy server 130 is configured to handle requests differently according to the category to which the session has been assigned by the machine learning engine, e.g. in a manner discussed above. If a category has not yet been assigned to the session by the machine learning engine (e.g. because that session is new), the reverse proxy server may treat the session as being established by a human user (non-bot), e.g. in a manner discussed above.

In one example, web requests that have been identified to be from a source that has been categorised as an account takeover bot with a high level of confidence could be rejected (e.g. not passed to the website by the proxy server 130, and therefore no response returned), whereas those with a lower level of confidence could be passed to the website by the proxy server 130, with the website then returning alternative content that requests they complete a verification exercise to determine if they were human or bot (e.g. a CAPTCHA test or equivalent), with any other requests at a lower level of confidence or not categorised at all would be returned the expected content for that request.

In this example, web requests that have been identified to be from a source that has been categorised as a more benign bot category (e.g. price scraper) could be passed to the website by the proxy server 130, with the website then returning normal content configured for a human user.

Of course, this is just one way in which web requests could be handled differently based on the factors highlighted above, and a skilled person would appreciate from the teaching herein that the way in which web requests could be handled differently depending on these factors may depend on the priorities of a given website and website administrator.

In general, the example computer system 101 described above is configured to work with web requests, rather than other forms of network traffic.

In some embodiments (not shown in the drawings), the reverse proxy server 130 could be eliminated, e.g. with a web server 120 that hosts the website or other element of network infrastructure being configured to pass information concerning requests to the streaming server 140. In this case, all requests could go to the web server 120, but the web server 120 could handle requests differently, based on whether sources are determined to be bots or non-bots, and/or based on categorisations assigned to sources by the machine learning engine 150, e.g. in a manner described above. For example, information concerning web requests could be captured by a program that sits on the web server 120 and passes that information to the streaming server 140. In this case, the machine learning engine 150 could make information concerning whether a given source is a bot or non-bot, and/or concerning which category is assigned to a source determined to be a bot, by appropriate means (e.g. via an API or other integration)

The invention could be extended to look at the categorisation of traffic in other areas. For example, categorising the intent of human as well as non-human users.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

The section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment.

All references mentioned above are hereby incorporated by reference.

The invention claimed is:

1. A method of processing web requests directed to a website in real-time, the method including:
   (i) receiving a plurality of web requests directed to the website;
   (ii) for each of the plurality of web requests, identifying a source from which the web request has originated;
   (iii) for a given source:
      aggregating, from the plurality of web requests, information describing a plurality of web requests originating from the source;
      using a machine learning engine to determine whether the source is a bot or a non-bot based on the aggregated information;
      when the source is determined to be a bot, using the machine learning engine or another machine learning engine to assign one of a plurality of predetermined bot categories to the source based on the aggregated information;
   wherein the method further includes:
   (A) when a first bot category of the plurality of predetermined bot categories is assigned to the source, the website issues a response that contains website content configured for the first bot category to one or more subsequent web requests sent by the source; and
   (B) when a second bot category of the plurality of predetermined bot categories is assigned to the source, the website issuing responses that contain website content configured for the second bot category to one or more subsequent web requests sent by the source.

2. A method according to claim 1, wherein each machine learning engine uses at least one model and/or algorithm that has been trained by the machine learning engine using historical web request data to assign one of the plurality of predetermined bot categories to the source, wherein the historical web request data includes previous web requests directed to the website.

3. A method according to claim 1, wherein the machine learning engine used to assign one of a plurality of predetermined bot categories to the source is configured to assign one of the plurality of predetermined bot categories to the source along with a confidence level associated with the assigned bot category, wherein the confidence level associated with the assigned bot category represents a level of confidence that the assigned bot category is correct.

4. A method according to claim 1, wherein the machine learning engine to determine whether the source is a bot or a non-bot is configured to use at least one model and/or algorithm that has been trained by the machine learning engine using historical web request data to determine whether the source is a bot or a non-bot based on the aggregated information.

5. A method according to claim 1, wherein the machine learning engine used to assign one of a plurality of predetermined bot categories to the source assigns one of the plurality of predetermined bot categories to the source based indirectly on the aggregated information, using information describing the aggregated information, wherein the information describing the aggregated information is extracted from the aggregated information before being passed to the machine learning engine.

6. A method according to claim 1, wherein a proxy server is configured to manage web requests directed to the website and responses to web requests issued by the website, wherein the proxy server is configured to receive web requests directed to the website, and to direct each response issued by the website to the source to which the response is directed.

7. A method according to claim 6, wherein the method further includes:
   (C) when the source is determined to be a non-bot, the proxy server passing one or more subsequent web requests sent by the source on to a web server hosting the website.

8. A method according to claim 6, wherein the method includes:
   (D) when a first third bot category of the plurality of predetermined bot categories is assigned to the source, the proxy server passing one or more subsequent web requests sent by the source on to a web server hosting the website.

9. A method according to claim 1, wherein the method includes:
   (E) when the source is determined to be a non-bot, the website issuing a response that contains website content configured for a non-bot to one or more subsequent web requests sent by the source.

10. A method according to claim 7, wherein any one or more of steps (A)-(C) is dependent on a confidence level.

11. A method according to claim 7, wherein any one or more of steps (A)-(C) is dependent on a rate of web requests directed to the website.

12. A computer system for processing web requests directed to a website, wherein the computer system comprises a machine learning engine and at least one of a proxy server and a streaming server, wherein each of the proxy server and streaming server have a non-transitory computer-readable medium configured to produce information based on at least one of the web requests for the machine learning engine, and wherein the computer system is configured to carry out a method according to claim 1.

13. A non-transitory computer-readable medium having computer-executable instructions configured to cause a computer system to perform a method according to claim 1.

14. A method according to claim 1 wherein the plurality of predetermined bot categories contains two or more of: price scraping, ad fraud, content theft, search engine spider, account takeover, and fake account creation.

15. A method according to claim 7, wherein any one or more of steps (A)-(C) is dependent on a confidence level associated with the assigned bot category.

16. A method according to claim 7, wherein any one or more of steps (A)-(C) is dependent on a rate of web requests directed to the website.

17. A method according to claim 1, wherein there are more than two predetermined bot categories.

\* \* \* \* \*